Dec. 12, 1961  M. E. BOURNS  3,013,233
PRESSURE RESPONSIVE ELECTRICAL INSTRUMENTS
Original Filed June 14, 1956
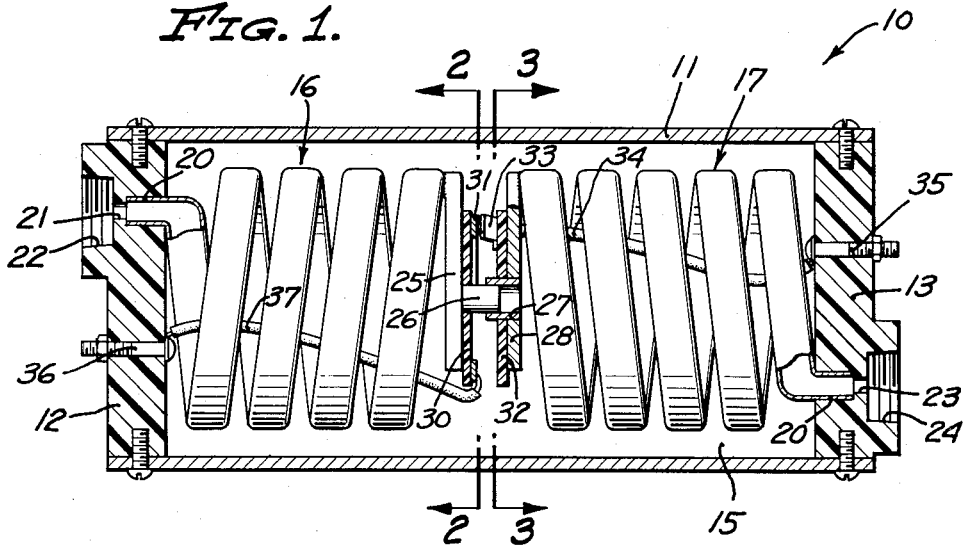
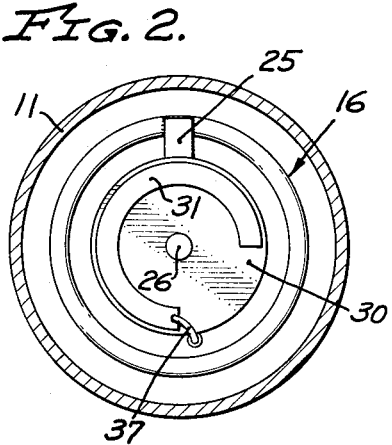
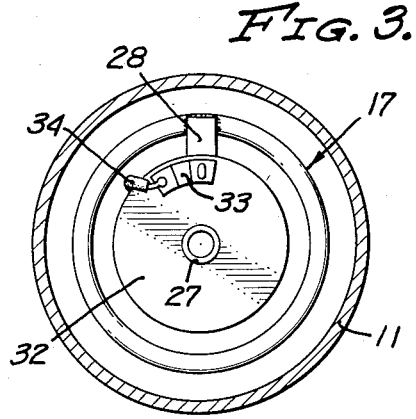
INVENTOR.
MARLAN E. BOURNS
BY Herbert E. Kidder
AGENT United States Patent Office 3,013,233
Patented Dec. 12, 1961

3,013,233
PRESSURE RESPONSIVE ELECTRICAL
INSTRUMENTS
Marlan E. Bourns, 2482 Carlton Place, Riverside, Calif.
Continuation of application Ser. No. 591,370, June 14, 1956. This application Apr. 11, 1960, Ser. No. 21,361
8 Claims. (Cl. 338—40)

The present invention relates to pressure transducers, and is a continuation of my pending application, Serial No. 591,370, filed June 14, 1956 now Patent No. 2,932,807, entitled Pressure Responsive Electrical Instruments.

More specifically, the present invention is concerned with pressure transducers of the Bourdon tube type embodying a variable resistor wherein movement of the free end of the Bourdon tube responsive to changes in the pressure differential between the inside and outside of the Bourdon tube is converted into an electrical signal that can be utilized to actuate a meter or the like, or to control some mechanism, or which can be telemetered to a remote control center.

The primary object of the present invention is to provide a pressure transducer of the Bourdon tube type, which is extremely sensitive in response, and in which the free end of the Bourdon tube moves over an extended range of travel, thereby providing improved resolution of the electrical signal.

Another object of the invention is to provide an instrument of the class described which is substantially unaffected by vibration and acceleration forces.

A further object of the invention is to provide a sensitive pressure responsive instrument embodying a coiled Bourdon tube having a plurality of turns, wherein the free end of the Bourdon tube is supported by pivotal support means so that it is free to turn responsive to changes in pressure differential between the inside and outside of the Bourdon tube, but is restrained against displacement in any other direction due to vibration or acceleration.

Still another object of the invention is to provide a differential pressure responsive instrument for producing an electrical signal that is a function of the sum or difference of two different fluid pressures, and which is extremely sensitive to the fluid pressures being measured, yet at the same time relatively insensitive to the effects of vibration and acceleration forces.

The foregoing objects are achieved in the present invention by using a coiled Bourdon tube having a plurality of turns, and a variable resistor having a rotary member and a stationary member. The rotary member of the variable resistor is connected directly to the movable end of the Bourdon tube so as to eliminate back-lash and other problems inherent in systems using mechanical amplification of the travel of the Bourdon tube. The movable end of the Bourdon tube is pivotally supported with respect to the stationary member of the variable resistor so that the free end of the Bourdon tube is restrained against movement other than rotational movement about the center of rotation of the said rotary member.

For the purpose of measuring differential pressures, the present invention provides two helical Bourdon tubes arranged end-to-end, the movable ends of the Bourdon tube being disposed adjacent one another and being connected together by pivotal means, whereby the ends of the Bourdon tubes are restrained against sideways movement with respect to one another. The resistance element of the variable resistor is mounted on one of the helical Bourdon tubes, and the contact member is mounted on the other. Two different fluid pressure sources may be connected to the two Bourdon tubes, and the relative displacement of the contact member with respect to the resistance member is a function of the sum or difference of the fluid pressures, depending upon which way the two helical Bourdon tubes are coiled.

The foregoing and other objects and advantages of the present invention will become apparent to those skilled in the art upon consideration of the following detailed description of the preferred embodiment thereof, reference being had to the accompanying drawings, wherein:

FIGURE 1 is a longitudinally sectioned view of a pressure responsive instrument embodying the principles of the present invention;

FIGURE 2 is a transverse section of the same, taken at 2—2 in FIGURE 1; and

FIGURE 3 is a sectional view, taken at 3—3 in FIGURE 1.

In the drawings, the reference numeral 10 designates the pressure transducer in its entirety. The instrument 10 includes a housing consisting of a tubular case 11 which is closed at both ends by circular end plates 12 and 13. The end plates 12 and 13, together with the tubular case 11, enclose a cavity 15 within which are disposed two helically coiled Bourdon tubes 16 and 17. The Bourdon tubes 16, 17 are arranged end-to-end, and are coaxial with respect to one another. The outer ends of the Bourdon tubes 16, 17 are bent outwardly to provide axially projecting portions 20 which are secured within holes in the end plates 12, 13. The interior of Bourdon tube 16 is connected by a short passageway 21 to a threaded aperture 22, which is adapted to receive a pipe fitting connecting the Bourdon tube to a suitable source of fluid pressure. The other Bourdon tube 17 is likewise connected by a short passageway 23 to a threaded aperture 24, into which another pipe fitting may be screwed to connect the Bourdon tube 17 to a second source of fluid pressure.

The inner ends of the Bourdon tubes 16, 17 are plugged in the usual manner, and these ends are movable responsive to changes in the pressure differential between the inside and outside of the Bourdon tube. As the pressure on the inside of the Bourdon tube increases, the helically wound tube tends to unwind, thereby causing the free end of the Bourdon tube to move in a substantially circular path around the axis of the helix. A radially extending bar 25 is fixed to the movable end of Bourdon tube 16, and projecting from the outer face of the said bar is a pivot pin 26. The pin 26 is rotatably received within a sleeve bearing 27 fixed to another radially extending bar 28 which is attached to the movable end of Bourdon tube 17. Thus, the adjacent ends of the Bourdon tubes 16, 17 are pivotally connected together by means of the pivot pin 26 and sleeve bearing 27, so that the movable ends of the Bourdon tubes are free to turn with respect to one another, but are restrained against radial, or sideways, movement with respect to one another.

Mounted on the outer face of the bar 25 concentric with the pin 26 is a disc 30 of dielectric material, such as plastic or the like, and secured on the outer face of the disc 30 is an arcuate resistance element 31 which may be of composition material, or it may be of the wire-wound variety. As best shown in FIGURE 2, the center of curvature of the arcuate resistance element 31 coincides with the center of the pivot pin 26.

Mounted on the outer face of the bar 28 concentric with the sleeve bearing 27 is another disc 32 of dielectric material, and attached to the face of the disc 32 adjacent the outer periphery thereof is a spring contact member 33 which extends across the gap to the resistance element 31, and presses lightly against the surface thereof to make electrical contact therewith. The contact 33 is connected by a wire 34 to a terminal 35 on end plate 13, while the resistance element 31 is connected at one end thereof to a terminal 36 on end plate 12 by means of a wire 37. If desired, the two ends of the resistance element 31 may be connected to two separate terminal posts, so that the electrical signal means of the instrument may be used as a potentiometer.

The operation of the invention is believed to be clear from the foregoing description and the drawings. Fluid pressure is introduced into the interior of each of the helically coiled Bourdon tubes 16, 17, causing the movable ends thereof to rotate in a circular path as the Bourdon tube attempts to straighten out. The pivotal connections 26, 27 provides a support for the movable end of the Bourdon tube between the contact 33 and resistance element 31 other than rotational movement about the pivot center. Thus, relative sideways movement between the contact member and resistance element due to vibration or acceleration forces is prevented, and the instrument is relatively insensitive to such forces. The multiple turns of the helical Bourdon tubes provide a large travel of the movable ends for any given increment of pressure change, and this eliminates the need for multiplying linkage to amplifiy the travel of the Bourdon tube so as to provide enough length of travel of the contact 33 along the length of the resistance element for adequate range and resolution of the electrical signal.

The Bourdon tube 17 may be evacuated to a vacuum and the threaded aperture 24 sealed by a suitable plug. In this condition, the instrument would provide an absolute pressure gage reading for fluid pressure admitted to the interior of Bourdon tube 16. Alternatively, the threaded aperture 24 might be opened to the atmosphere, in which case the instrument would indicate the difference between the fluid pressure admitted to Bourdon tube 16 and atmospheric pressure. The cavity 15 may be evacuated, or filled with gas at some predetermined pressure, and is then sealed so as to maintain a constant pressure on the outside of the Bourdon tubes 16, 17.

Where it is desired to measure the sum or difference of two different fluid pressures, one of the sources of fluid pressure may be connected to the interior of Bourdon tube 16, and the other connected to the interior of Bourdon tube 17. In this case, the two Bourdon tubes 16, 17 will react to their respective pressure differentials, producing relative movement of the contact member 33 with respect to the resistance element 31 that is a function of the sum or differences of the fluid pressures, depending upon the direction in which the coils of the helices 16, 17 are wound.

While I have shown and described in considerable detail what I believe to be the preferred form of my invention, it will be understood that various changes may be made in the shape and arrangement of the several parts without departing from the broad scope of the invention, as defined in the appended claims.

I claim:

1. A pressure responsive instrument comprising a housing, a coiled Bourdon tube mounted at one end on said housing, the other end of said Bourdon tube being movable in an arcuate path responsive to changes in the pressure differential between the inside and outside of said Bourdon tube, a resistance member and a contact member disposed for movement relative to one another, said contact member being adapted to wipe on said resistance member along the lengthwise dimension thereof, one of said members being mounted on said movable end of said Bourdon tube, support means for the other of said members, rigid means on said Bourdon tube extending laterally from the movable end thereof through the center of the arcuate path traversed by said movable end, and a pivotal connection between said last-named means and said support means, said pivotal connection being located at the center of arcuate movement of said movable end of said Bourdon tube and serving to prevent displacement of said contact member with respect to said resistance member other than along the lengthwise dimension thereof.

2. A pressure responsive instrument as defined in claim 1, wherein said Bourdon tube is coiled into the form of a helix.

3. A pressure responsive instrument as defined in claim 1, wherein said contact member is mounted on said movable end of said Bourdon tube, and said resistance member is mounted on said support means.

4. A pressure responsive instrument comprising a housing, a coiled Bourdon tube tube mounted at one end on said housing, the other end of said Bourdon tube being movable in an arcuate path responsive to changes in the pressure differential between the inside and outside of said Bourdon tube, a resistance element mounted within said housing generally parallel to the line of travel of said movable end of said Bourdon tube, supporting means pivoted for rotation about a center point substantially at the center of curvature of said coiled Bourdon tube, said supporting means being connected with said movable end of said Bourdon tube to support the same for arcuate movement about said center point and to restrain said movable end of said Bourdon tube against radial movement with respect to said center point, and a contact member operatively connected to said movable end of said Bourdon tube and wiping on said resistance element.

5. A pressure responsive instrument as defined in claim 4, wherein said Bourdon tube is coiled into the form of a helix.

6. A pressure responsive instrument comprising a housing, a first coiled Bourdon tube mounted at one end on said housing, a second coiled Bourdon tube mounted at one end on said housing coaxial with said first coiled Bourdon tube, the free ends of said Bourdon tubes being movable in concentric circular paths responsive to changes in the pressure differential between the inside and outside of said Bourdon tubes, means pivotally connecting the free ends of said Bourdon tubes together whereby said said free ends are rotatable with respect to one another but restrained against radial movement with respect to one another, a resistance element mounted on the free end of one of said Bourdon tubes, and a contact member mounted on the free end of the other Bourdon tube, said contact member wiping on said resistance element.

7. A pressure responsive instrument as defined in claim 6, wherein said resistance element is curved into the form of a circular arc having its center of curvature coincident with the center of said pivotal connecting means, and said contact member is movable in an arcuate path concentric with the curvature of said resistance element.

8. A differential pressure responsive instrument as defined in claim 6, wherein said Bourdon tubes are coiled into the form of helices, said first and second Bourdon tubes being disposed end to end, with their respective free ends closely adjacent one another, and means for introducing fluid pressure media from two different pressure sources to the interiors of said Bourdon tubes, respectively.

References Cited in the file of this patent

UNITED STATES PATENTS

| | | |
|---|---|---|
| 2,622,177 | Klose | Dec. 16, 1952 |
| 2,810,800 | Hasselhorn | Oct. 22, 1957 |

FOREIGN PATENTS

| | | |
|---|---|---|
| 714,507 | Great Britain | Sept. 1, 1954 |

UNITED STATES PATENT OFFICE
CERTIFICATE OF CORRECTION

Patent No. 3,013,233                          December 12, 1961

Marlan E. Bourns

It is hereby certified that error appears in the above numbered patent requiring correction and that the said Letters Patent should read as corrected below.

Column 3, line 14, for "connections 26, 27 provides a support" read -- connection 26, 27 provides support --; line 29, after "vacuum" insert a comma; column 4, line 14, strike out "tube", second occurrence.

Signed and sealed this 25th day of September 1962.

(SEAL)
Attest:

ERNEST W. SWIDER                          DAVID L. LADD
Attesting Officer                            Commissioner of Patents